United States Patent
Miller et al.

(10) Patent No.: US 10,443,436 B2
(45) Date of Patent: Oct. 15, 2019

(54) MODULAR ANNULAR HEAT EXCHANGER

(71) Applicant: General Electric Company, Schenectady, NY (US)

(72) Inventors: Brandon Wayne Miller, Liberty Township, OH (US); Matthew Robert Cerny, West Chester, OH (US); Nicholas Taylor Moore, West Chester, OH (US)

(73) Assignee: General Electric Company, Schenectady, NY (US)

( * ) Notice: Subject to any disclaimer, the term of this patent is extended or adjusted under 35 U.S.C. 154(b) by 700 days.

(21) Appl. No.: 15/200,686

(22) Filed: Jul. 1, 2016

(65) Prior Publication Data
US 2018/0003076 A1    Jan. 4, 2018

(51) Int. Cl.
*F01D 9/04* (2006.01)
*F01D 25/12* (2006.01)
(Continued)

(52) U.S. Cl.
CPC .............. *F01D 25/12* (2013.01); *F01D 9/041* (2013.01); *F01D 9/042* (2013.01); *F01D 25/14* (2013.01);
(Continued)

(58) Field of Classification Search
CPC .......... F01D 9/041; F01D 9/042; F01D 25/12; F05D 2260/213; F28D 1/0308;
(Continued)

(56) References Cited

U.S. PATENT DOCUMENTS

| 2,479,071 A | 8/1949 | Henstridge |
| 4,086,910 A | 5/1978 | Rowland |
| (Continued) | | |

FOREIGN PATENT DOCUMENTS

| EP | 2620618 A2 | 7/2013 |
| GB | 2 343 643 A | 5/2000 |
| (Continued) | | |

OTHER PUBLICATIONS

International Search Report and Written Opinion issued in connection with corresponding PCT Application No. PCT/US2017/40138 dated Oct. 10, 2017.

*Primary Examiner* — Ninh H. Nguyen
(74) *Attorney, Agent, or Firm* — Dority & Manning, P.A.

(57) ABSTRACT

An annular duct including a modular annular heat exchanger for a gas turbine engine is provided, where the modular annular heat exchanger includes a plurality of radial modules in circumferentially adjacent arrangement. Each radial module includes a cooled fluid inlet plenum segment, a plurality of blades, and a cooled fluid outlet plenum segment. The plurality of blades is configured in circumferentially adjacent arrangement and defines an angular space that is conformal between each circumferentially adjacent blade. The cooled fluid inlet plenum segment, the plurality of blades, and the cooled fluid outlet plenum segment are in serial axial flow arrangement and define an internal cooled fluid flowpath and an external cooling fluid flowpath parallel to the internal cooled fluid flowpath. Each radial module further includes an inner annular ring segment and an outer annular ring segment. The inner annular ring segment and the outer annular ring segment define a plurality of blade retainers. The blade retainers define an axial, radial, and circumferential position of the blades, the cooled fluid inlet (Continued)

plenum segment, and the cooled fluid outlet plenum segment.

19 Claims, 10 Drawing Sheets

(51) Int. Cl.
| | |
|---|---|
| *F02C 7/14* | (2006.01) |
| *F28D 9/00* | (2006.01) |
| *F01D 25/14* | (2006.01) |
| *F28D 1/03* | (2006.01) |
| *F28F 9/007* | (2006.01) |
| *F28F 9/02* | (2006.01) |
| *F28D 1/02* | (2006.01) |
| *F28D 21/00* | (2006.01) |

(52) U.S. Cl.
CPC .............. *F02C 7/14* (2013.01); *F28D 1/0308* (2013.01); *F28D 1/0358* (2013.01); *F28D 9/0012* (2013.01); *F28F 9/0075* (2013.01); *F28F 9/02* (2013.01); *F05D 2250/38* (2013.01); *F05D 2260/208* (2013.01); *F05D 2260/213* (2013.01); *F05D 2260/22141* (2013.01); *F28D 2001/0273* (2013.01); *F28D 2021/0026* (2013.01); *Y02T 50/672* (2013.01); *Y02T 50/676* (2013.01)

(58) Field of Classification Search
CPC .... F28D 1/0358; F28D 9/0012; F28D 9/0075; F28D 9/02; F28D 2001/0273; F28D 2021/0026

See application file for complete search history.

(56) References Cited

U.S. PATENT DOCUMENTS

| | | | | |
|---|---|---|---|---|
| 4,137,705 | A | * | 2/1979 | Andersen .................. F02C 7/14 60/39.08 |
| 5,702,073 | A | | 12/1997 | Fluegel |
| 6,134,880 | A | | 10/2000 | Yoshinaka |
| 7,946,806 | B2 | * | 5/2011 | Murphy .................... F02C 7/14 415/145 |
| 8,387,362 | B2 | | 3/2013 | Storage et al. |
| 8,763,363 | B2 | | 7/2014 | Ranganathan |
| 2012/0243970 | A1 | | 9/2012 | Hellgren et al. |
| 2013/0186102 | A1 | | 7/2013 | Lo |
| 2013/0236299 | A1 | | 9/2013 | Kington et al. |
| 2014/0216056 | A1 | | 8/2014 | Schwarz et al. |
| 2014/0338334 | A1 | | 11/2014 | Karam et al. |
| 2015/0023778 | A1 | | 1/2015 | Berg et al. |
| 2015/0027676 | A1 | | 1/2015 | Eilken et al. |
| 2016/0090863 | A1 | * | 3/2016 | Diaz ....................... F01D 25/18 60/39.1 |

FOREIGN PATENT DOCUMENTS

| | | |
|---|---|---|
| GB | 2519148 A | 4/2015 |
| WO | WO 2015/074052 A1 | 5/2015 |

* cited by examiner

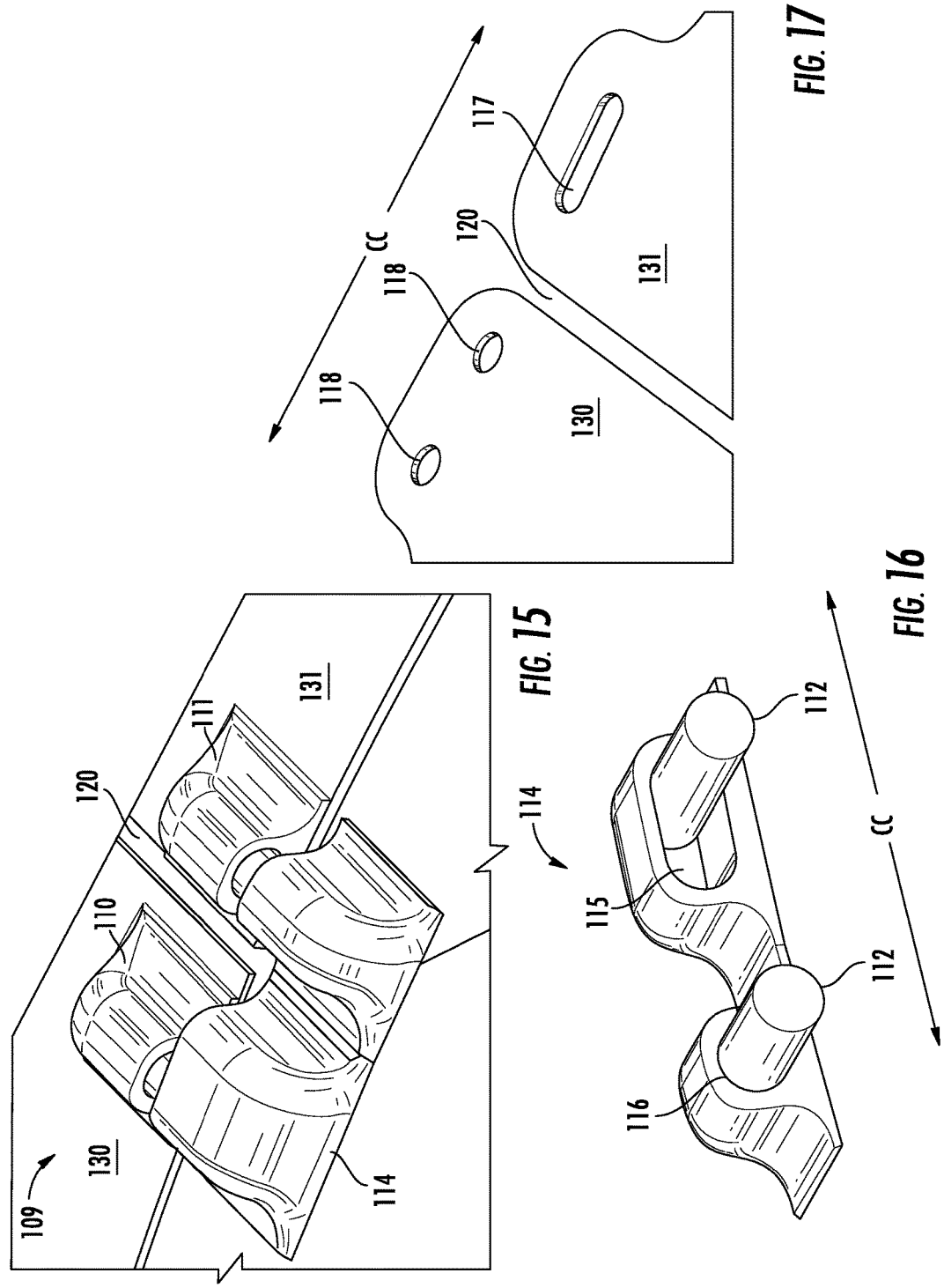

MODULAR ANNULAR HEAT EXCHANGER

FIELD OF THE INFORMATION

The present invention relates generally to gas turbine engines and, more particularly, to a heat exchange arrangement in a fan duct of a gas turbine engine for cooling high pressure hot bleed air.

BACKGROUND OF THE INVENTION

Many commercial aircraft gas turbine engines employ high pressure hot air bled from the core engine compressor for use by different systems on the aircraft. In particular, the high pressure air is required by a variety of tasks on the aircraft, such as anti-icing and passenger cabin cooling. However, prior to use of the air, the temperature of the air must be lowered to reasonable levels in accordance with the requirements of each specific task.

One current method of cooling the high pressure compressor bleed air is to extract or bleed air from the engine fan duct imbedded within the engine case. The cooler bleed air from the fan duct and the high pressure hotter bleed air from the core engine compressor are then passed through a heat exchanger where the hotter high pressure air gives up some of its thermal energy to the cooler fan duct bleed air.

Use of the heat exchange process is necessary, although, current systems for attaining heat transfers are unduly complex. In one system, an elaborate layout of piping is employed to pass the high pressure bleed air to the aircraft and to route the cooler fan duct bleed air to the location of the heat exchanger. By the time the cooler fan duct bleed air reaches the heat exchanger and performs its cooling task, it has lost most of its pressure (thrust potential) due to frictional losses because of various bends and turns of the piping. After exiting from the heat exchanger, the fan duct bleed air is discharged overboard from the aircraft structure with a negligible thrust benefit. The impact of the fan duct bleed air thrust loss on engine specific fuel consumption is significant. Furthermore, the excessively complex bleed air piping adds significantly to the aircraft weight.

Consequently, a need still remains for improvements in the arrangement for performing heat transfer operations which will avoid the fan duct bleed air loss experienced by the prior art.

BRIEF DESCRIPTION OF THE INVENTION

Aspects and advantages of the invention will be set forth in part in the following description, or may be obvious from the description, or may be learned through practice of the invention.

An annular duct is generally provided that includes a modular annular heat exchanger for a gas turbine engine. In one embodiment, the modular annular heat exchanger includes a plurality of radial modules in circumferentially adjacent arrangement. Each radial module includes a cooled fluid inlet plenum segment, a plurality of blades, and a cooled fluid outlet plenum segment. The plurality of blades is configured in circumferentially adjacent arrangement and defines an angular space that is conformal between each circumferentially adjacent blade. The cooled fluid inlet plenum segment, the plurality of blades, and the cooled fluid outlet plenum segment are in serial axial flow arrangement and define an internal cooled fluid flowpath and an external cooling fluid flowpath parallel to the internal cooled fluid flowpath. Each radial module further includes an inner annular ring segment and an outer annular ring segment. The inner annular ring segment and the outer annular ring segment define a plurality of blade retainers. The blade retainers define an axial, radial, and circumferential position of the blades, the cooled fluid inlet plenum segment, and the cooled fluid outlet plenum segment.

An annular duct is also generally provided for a gas turbine engine. In one embodiment, the annular duct includes a cooled fluid inlet plenum, a plurality of blades, and a cooled fluid outlet plenum. The cooled fluid inlet plenum includes a plurality of cooled fluid inlet plenum segments in circumferentially adjacent arrangement defining a circumferential space between each cooled fluid inlet plenum segment. The plurality of blades is configured in circumferentially adjacent arrangement and defines an angular space that is approximately uniform between each circumferentially adjacent blade. The cooled fluid outlet plenum includes a plurality of cooled fluid inlet plenum segments in circumferentially adjacent arrangement to one another and defines a circumferential space between each cooled fluid outlet plenum segment. The cooled fluid inlet plenum segment, the plurality of blades, and the cooled fluid outlet plenum segment are in serial axial flow arrangement and define an internal cooled fluid flowpath and an external cooling fluid flowpath at least partially parallel to the internal cooled fluid flowpath. The annular duct further includes an inner annular ring and an outer annular ring, each defining a plurality of blade retainers. The inner annular ring includes at least a first inner annular ring segment and a second inner annular ring segment in circumferentially adjacent arrangement defining an inner diameter circumferential gap. The outer annular ring includes at least a first outer annular ring segment and a second outer annular ring segment in circumferentially adjacent arrangement defining an outer diameter circumferential gap. The blade retainers define an axial, circumferential, and radially inward and outward position of the blades, the cooled fluid inlet plenum, and the cooled fluid outlet plenum. The blade retainers further define an axial, circumferential, and radial position of the first inner annular ring segment and the second inner annular ring segment defining an inner diameter circumferential gap. The annular duct further includes a mount assembly. The mount assembly includes a first pin housing positioned on the first inner annular ring segment, a second pin housing positioned on the second inner annular ring segment, and a plurality of pins.

A gas turbine engine is also generally provided that includes, in one embodiment, an annular duct and a pin retainer. The pin retainer is positioned on an engine component axially adjacent to the first pin housing and the second pin housing of the mount assembly of the annular duct.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 15 shows a perspective view of an exemplary embodiment of a mount assembly according to one embodiment of the present disclosure;

FIG. 16 shows a perspective view of an exemplary embodiment of a pin retainer of the exemplary mount assembly of FIG. 15;

FIG. 17 shows a perspective view of an exemplary mount assembly attachment interface according to one embodiment of the present disclosure.

Figure 1:
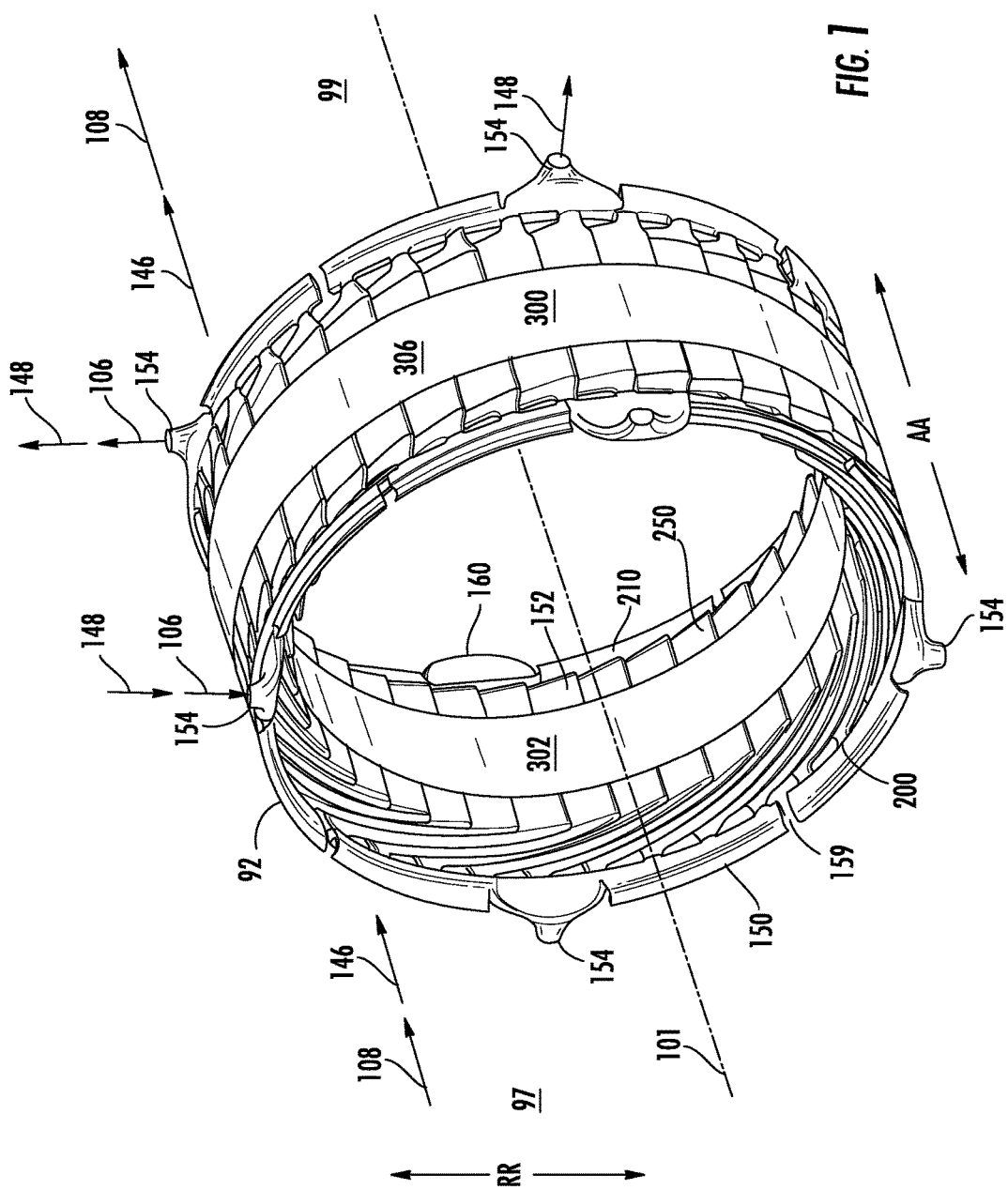
FIG. 1 shows a perspective view of an exemplary modular annular heat exchanger according to one embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, a "fluid" may be a gas or a liquid. The present approach is not limited by the types of fluids that are used. In the preferred application, the cooling fluid is fan or low pressure compressor air, and the cooled fluid is bleed air from the high pressure compressor. However, the present approach may be used for other types of liquid and gaseous fluids, where the cooled fluid and the cooling fluid are the same fluids or different fluids. Other examples of the cooled fluid and the cooling fluid include air, hydraulic fluid, fuel, oil, combustion gas, refrigerant, refrigerant mixtures, dielectric fluid for cooling avionics or other aircraft electronic systems, water, water-based compounds, water mixed with antifreeze additives (e.g., alcohol or glycol compounds), and any other organic or inorganic heat transfer fluid or fluid blends capable of persistent heat transport at elevated or reduced temperature.

An annular duct including a modular annular heat exchanger is generally provided that includes conformal geometries that allow for minimally restricted axial, radial, and circumferential thermal growth while maintaining the axial, radial, and circumferential relationships of the components of the heat exchanger. Although the heat exchanger system described herein is broadly applicable to a variety of heat exchanger applications involving multiple fluid types, it is described herein for its high-effectiveness cooling of bleed air (e.g., the hot stream or heat "source") with fan or low pressure compressor air (e.g., the cold stream or heat "sink") in a gas turbine engine. It should be noted that although the present description relates to heat exchangers that are used in high by-pass turbine engines, one of ordinary skill in the art would understand that the description is not limited to being used in high by-pass turbine engines. Rather, the provided heat exchangers may be used in any engine and/or apparatus requiring heat exchange, including, but not limited to, turbofan, turboprop, turboshaft, turbojet, reciprocal engines, and Brayton cycle machines. The heat exchanger is generally provided for a turbine engine that is coupled to at least one of a fan casing and an engine casing of the turbine engine.

Figure 2:
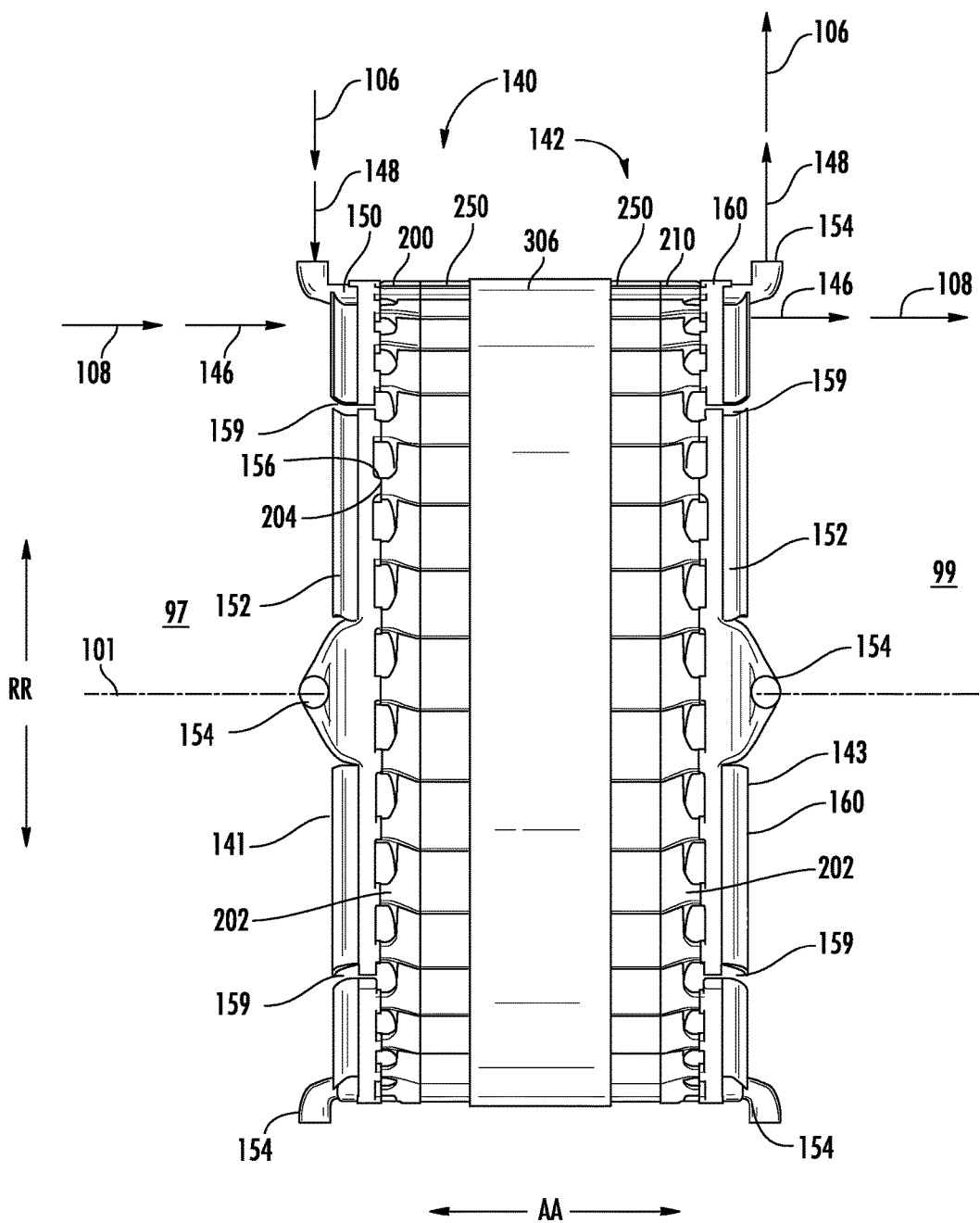
FIG. 2 shows a side view of an exemplary modular annular heat exchanger according to one embodiment of the present disclosure.

Referring to FIG. 1 and FIG. 2, an exemplary embodiment of a modular annular heat exchanger 100 is provided, defined by the serial axial combination of a cooled fluid inlet plenum 140, a plurality of blades 250, and a cooled fluid outlet plenum 142, each in annular arrangement. The serial axial flow arrangement of the cooled fluid inlet plenum 140, the plurality of blades 250, and the cooled fluid outlet plenum 142 define an internal cooled fluid flowpath 106, through which a cooled fluid 148 flows (e.g. from the hot stream), and an external cooling fluid flowpath 108, along which a cooling fluid 146 flows (e.g. from the cold stream). The external cooling fluid flowpath 108 extends axially (along direction AA) through the heat exchanger 100 and is at least partially parallel with the internal cooled fluid flowpath 106. The continuous arrangement of circumferentially adjacent blades 250 defines an axisymmetric heat transfer area throughout the circumference and annular flowpaths 106, 108 of the heat exchanger 100 such that the cooled fluid 148 and the cooling fluid 146 do not bypass the heat exchanger 100. Additionally, the continuous axisymmetric heat transfer area shares the thermal loads throughout the entire circumference of the heat exchanger 100 and limits circumferential variations in temperature of the cooling fluid 146 or the cooled fluid 148 as it exits the heat exchanger 100.

The cooled fluid inlet plenum 140 includes a plurality of cooled fluid inlet plenum segments 141 in circumferentially adjacent arrangement. The cooled fluid inlet plenum segment 141 includes a feeder plenum segment 152 and a blade plenum segment 202 in serial axial arrangement. The plurality of circumferentially adjacent feeder plenum segments 152 included in the cooled fluid inlet plenum 140 define a first feeder plenum 150. The plurality of circumferentially adjacent and partially overlapping blade plenum segments 202 included in the cooled fluid inlet plenum 140 define a first blade plenum 200.

The cooled fluid outlet plenum 142 includes a plurality of cooled fluid outlet plenum segments 143 in circumferentially adjacent arrangement. The cooled fluid outlet plenum segment 143 includes a blade plenum segment 202 and a feeder plenum segment 152 in serial axial arrangement. The plurality of circumferentially adjacent feeder plenum segments 152 included in the cooled fluid outlet plenum 142 define a second feeder plenum 160. The plurality of circumferentially adjacent blade plenum segments 202 included in the cooled fluid outlet plenum 142 define a second blade plenum 210.

In the exemplary embodiment of the heat exchanger 100 shown in FIG. 1 and FIG. 2, an annular circumference 92 of the cooled fluid inlet and outlet plenums 140, 142 is segmented into quarters, which may permit radial, axial, and circumferential growth of the heat exchanger 100 while reducing thermal stresses, as well as allow for tuning the vibratory response of the heat exchanger 100 to reduce high cycle fatigue. In other embodiments, the annular circumference 92 of the cooled fluid inlet and outlet plenums 140, 142 is segmented into halves, or thirds, or sixths, or twelfths, etc.

Each pair of cooled fluid inlet or outlet plenum segments 141, 143 define a circumferential space 159 between each pair of circumferentially adjacent cooled fluid inlet or outlet plenum segments 141, 143. The plurality of feeder plenum segments 152, as part of the cooled fluid inlet or outlet plenum segments 141, 143, in annular circumferentially adjacent arrangement defines a circumferential space 159 between each pair of circumferentially adjacent feeder plenum segments 152. The segmented feeder plenum 150, 160 may permit radial, circumferential, and axial growth of the heat exchanger 100 while reducing thermal stresses by reducing structural constraints and maintaining the non-contacting circumferential space 159 between each feeder plenum segment 152 on the first and second feeder plenums 150, 160.

The first and second blade plenum 200, 210 includes a plurality of blade plenum segments 202. Each blade plenum segment 202 is fluidly connected at a blade plenum opening 204 at a feeder plenum egress 156 on each feeder plenum segment 152. The feeder plenum egress 156 and blade plenum opening 204 define a male-female connection i.e. the feeder plenum egress 156 defines an axially elongated outer perimeter 157 lesser than an inner perimeter 207 at the blade plenum opening 204. The male-female connection between the blade plenum 200, 210 and the feeder plenum 150, 160 may reduce thermal stresses by allowing for minimally restricted axial thermal growth.

The plurality of blades 250 is fluidly connected to each blade plenum segment 202 at the first blade plenum 200 at a first end 97 of the blades 250 and at the second blade plenum 210 at a second end 99 of the blade 250. A blade containment annular ring 306 provides radial and axial support for the plurality of blades 250. The plurality of each connection of the blade 250 to the blade plenum segment 202 defines an annular circumferentially adjacent arrangement. Additionally, the plurality of blades 250 defines a plurality of internal cooled fluid flowpaths 106 between the cooled fluid inlet plenum 140 and the cooled fluid outlet plenum 142.

Each feeder plenum segment 152 on the feeder plenums 150, 160 includes a feeder plenum opening 154 through which the cooled fluid 148 enters or exits the internal cooled fluid flowpath 106. The cooled fluid 148 is relatively hotter than the cooling fluid 146 flowing along the cooling fluid flowpath 108 defined across the plurality of blades 250 from the first end 97 to the second end 99 of the modular annular heat exchanger 100. The cooled fluid 148 flows along the internal cooled fluid flowpath 106 defined by the serial flow arrangement through the feeder plenum opening 154 at the first feeder plenum 150, the first bleed plenum 200, the plurality of blades 250, the second bleed plenum 210, and the second feeder plenum 160, exiting through the feeder plenum opening 154 at the second feeder plenum 160. It should be understood that the flow direction of the cooled fluid 148 along the cooled fluid flowpath 106 may be changed as desired.

Figure 3:
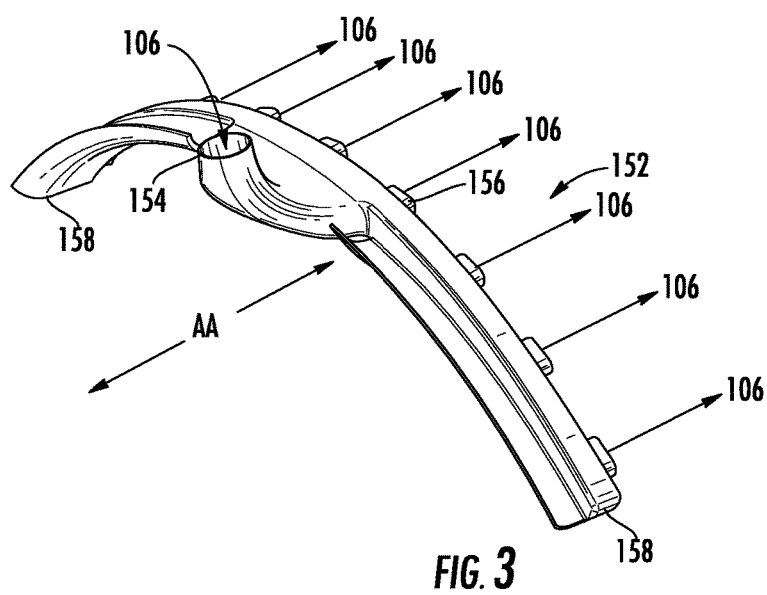
FIG. 3 shows a perspective view of an exemplary feeder plenum segment according to one embodiment of the present disclosure.
Figure 4:
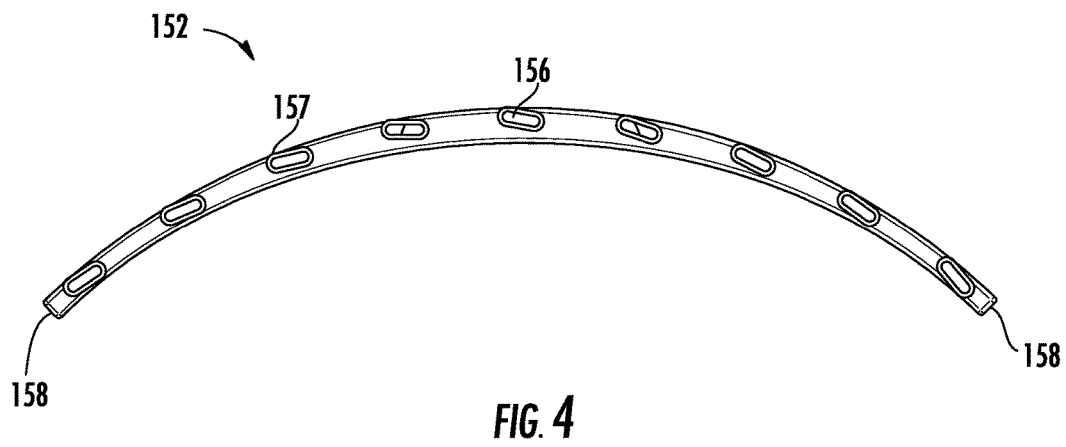
FIG. 4 shows a side view of the exemplary feeder plenum segment of FIG. 3.

Referring now to FIG. 3 and FIG. 4, an exemplary embodiment of a feeder plenum segment 152 is shown in detail, including a feeder plenum opening 154 and a plurality of feeder plenum egresses 156 on a side of the feeder plenum segment 152 opposite of the feeder plenum opening 154. The feeder plenum opening 154 may be configured to connect a supply tube, manifold, or fitting supplying the cooled fluid 148 to the heat exchanger 100. For example, in one embodiment, the feeder plenum opening 154 may define a circular opening or a slot with a radially elongated opening. In another embodiment, the feeder plenum opening 154 includes a groove to which a mechanical seal is placed (e.g. a gasket, metal ring, or o-ring). In yet another embodiment, the feeder plenum 154 may include male or female threads to connect a supply tube, manifold, or fitting supplying the cooled fluid 148. In still other embodiments, a hose and clamp may be employed to connect a supply tube that supplies the cooled fluid 148 to the feeder plenum opening 154.

In the exemplary embodiment of the feeder plenum egress 156 as provided in FIG. 3 and FIG. 4, a plurality of feeder plenum egresses 156 are in adjacent circumferential arrangement. Each feeder plenum egress 156 defines a male connection to each blade plenum segment 202 i.e. each feeder plenum egress 156 defines an axially elongated opening protruding (along direction AA) from the feeder plenum segment 152 with the outer perimeter 157 lesser than the inner perimeter 207 (FIG. 5) of the blade plenum opening 204 to which the feeder plenum egress 156 interfaces. In the exemplary embodiment, the feeder plenum egress 156 defines a racetrack cross section i.e. two-halves of a semi-circle adjoined by straight lines of equal length. However, in other embodiments, the feeder plenum egress 156 defines a circular or rectangular cross section. In still other embodiments, the feeder plenum egress 156 is a female connection (i.e. there is a hole defined by any of the aforementioned embodiments rather than an elongated opening protruding from the feeder plenum segment 150), to which the blade plenum opening 204 provides a corresponding male connection.

In another embodiment of the feeder plenum segment 152, a plurality of feeder plenum openings 154 is included on the feeder plenum segment 152. The plurality of feeder plenum openings 154 may correspond to the quantity of feeder plenum egresses 156. As a non-limiting example, where the feeder plenum segment 152 includes nine feeder plenum egresses 156 as shown in FIG. 3 and FIG. 4, nine feeder plenum openings 154 may be included such that the feeder plenum segment 152 is configured as a fluid feeder at the feeder plenum openings 154 and the feeder plenum egresses 156. However, it should be appreciated that the feeder plenum segment 152 may define fewer or greater quantity of feeder plenum egresses 156 or openings 154.

In yet another embodiment, each feeder plenum opening 154 to each feeder plenum egress 156 defines an internal cooled fluid flowpath 106 separate and fluidly segregated from each circumferentially adjacent feeder plenum egress 156. A flowpath area of each internal cooled fluid flowpath 106 from the feeder plenum opening 154 to the feeder plenum egress 156 may be approximately constant. However, in another embodiment, the flowpath area may increase from the feeder plenum opening 154 to the feeder plenum egress 156 such as to minimize flow restriction.

In still another embodiment, the feeder plenum opening 154, whether as a singular opening or as plurality thereof per feeder plenum segment 152, may be configured to define an internal cooled fluid flowpath 106 area to minimize a pressure differential between the feeder plenum opening 154 and the feeder plenum egress 156. As another example, the internal cooled fluid flowpath 106 area at the feeder plenum opening 154, or the sum of the plurality thereof, may be less than the area at the feeder plenum egress 156, or the sum of the plurality thereof, such as to minimize flow restriction at the feeder plenum egress 156.

Figure 5:
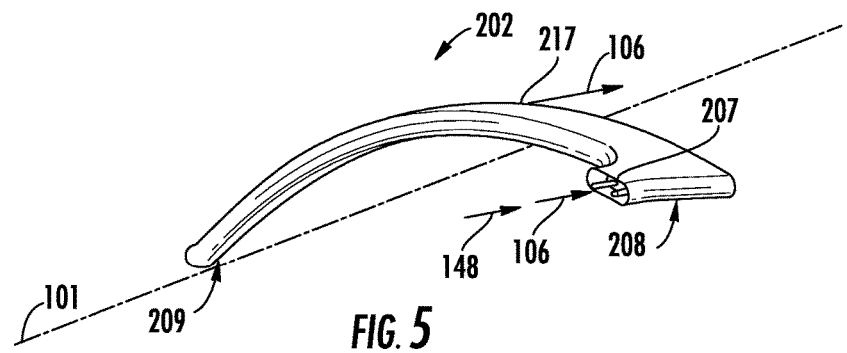
FIG. 5 shows a perspective view of an exemplary blade plenum segment according to one embodiment of the present disclosure.
Figure 6:
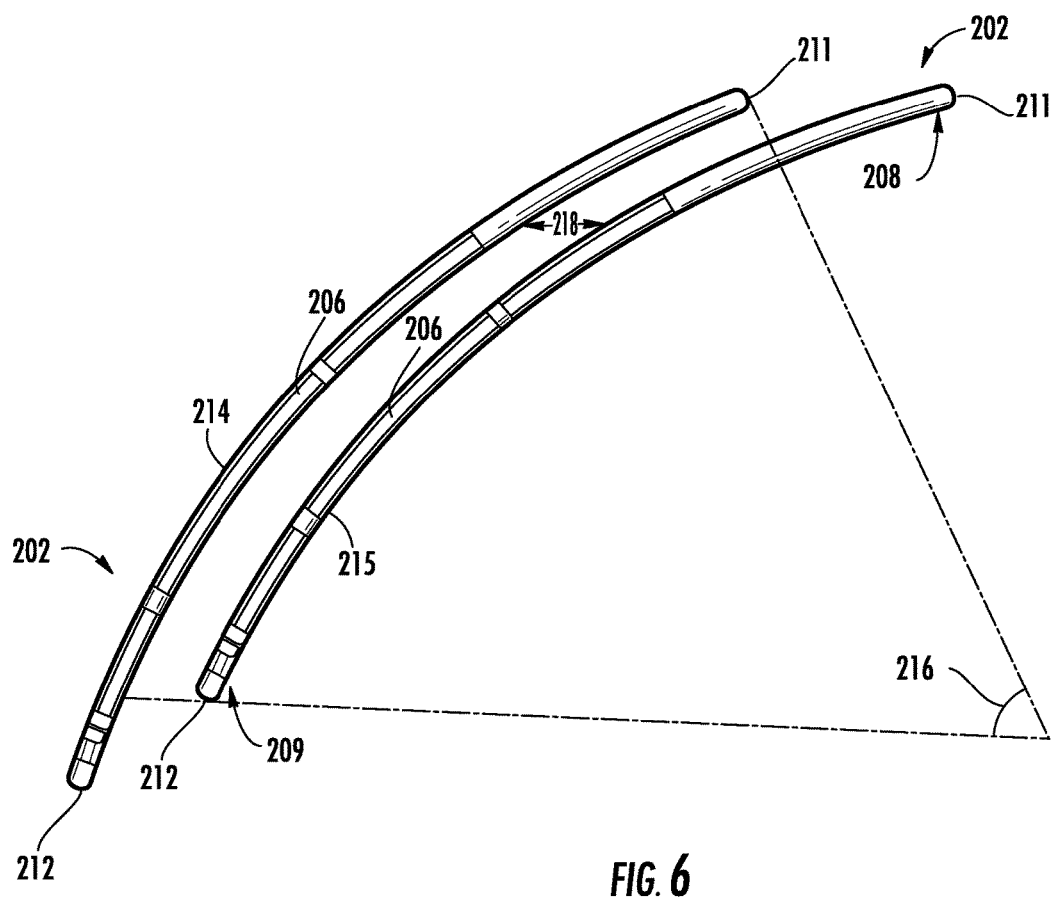
FIG. 6 shows a side view of the exemplary blade plenum segment of FIG. 5.

Referring to FIG. 5 and FIG. 6, in conjunction with FIG. 4, an exemplary embodiment is provided of a blade plenum segment 202. The blade plenum segment 202 includes the blade plenum opening 204, which defines a female connection to the feeder plenum egress 156 of each feeder plenum segment 152 i.e. each blade plenum opening 204 defines an axially elongated opening protruding (along direction AA) toward the feeder plenum egress 156 with the inner perimeter 207 greater than the outer perimeter 157 (FIG. 4) of feeder plenum egress 156. Together, the feeder plenum egress 156 (FIG. 4) and the blade plenum opening 204 are axially overlapped, maintaining a fluid connection between the plurality of bleed plenum segments 202 and feeder plenum segments 152 while permitting movement or variation in direction AA due to thermal expansion or vibrations during engine operation.

Referring now to FIG. 5 and FIG. 6, the exemplary embodiment of the blade plenum segment 202 provided includes a first radius 208 at a first end 211 and a second radius 209 at a second end 212 defining a generally curvilinear cross section, in which the first radius 208 is greater than the second radius 209 relative to an axial centerline 101. The plurality of blade plenum segments 202 define a partially overlapping circumferential angular relationship between each circumferentially adjacent blade plenum segment 202 in the blade plenums 200, 210.

For example, where a first blade plenum segment 214 is circumferentially adjacent to a second blade plenum segment 215 in a blade plenum 200, 210, the first and second blade plenum segments 214, 215 define an overlap angle 216 over which the first and second blade plenum segments 214, 215 are circumferentially overlapping relative to the axial centerline 101. The overlap angle 216 is a function of the quantity of blades 250 in the heat exchanger 100, the annular circumference 92 of heat exchanger 100, and the heat transfer requirements of the system to which the heat exchanger 100 is employed (e.g. the temperature, flow rate, and pressure of the cooled fluid 148 and the cooling fluid 146 and the desired change in temperature between the cooled fluid 148 and the cooling fluid 146). Altogether, the overlap angle 216 may at least partially define an optimal and axisymmetric heat transfer between the cooled fluid 148 and the cooling fluid 146.

In one embodiment, the overlap angle 216 is about 20 to 80 degrees i.e. a portion of the second blade plenum segment 215 of about 20 to 80 degrees of the annular circumference 92 of the modular annular heat exchanger 100 is overlapped by the first blade plenum segment 214. In another embodiment, the overlap angle 216 is about 30 to 70 degrees. In yet another embodiment, the overlap angle 216 is about 30 to 40 degrees.

Referring to FIGS. 3-6, the cooled fluid inlet plenum segment 141 or the cooled fluid outlet plenum segment 143 that are each defined by the feeder plenum segment 152 and the blade plenum segment 202 may be constructed as a single unitary structure, such as, for a non-limiting example, by additive manufacturing, casting, forging, or machining from a work piece, or a combination of processes.

Figure 7:
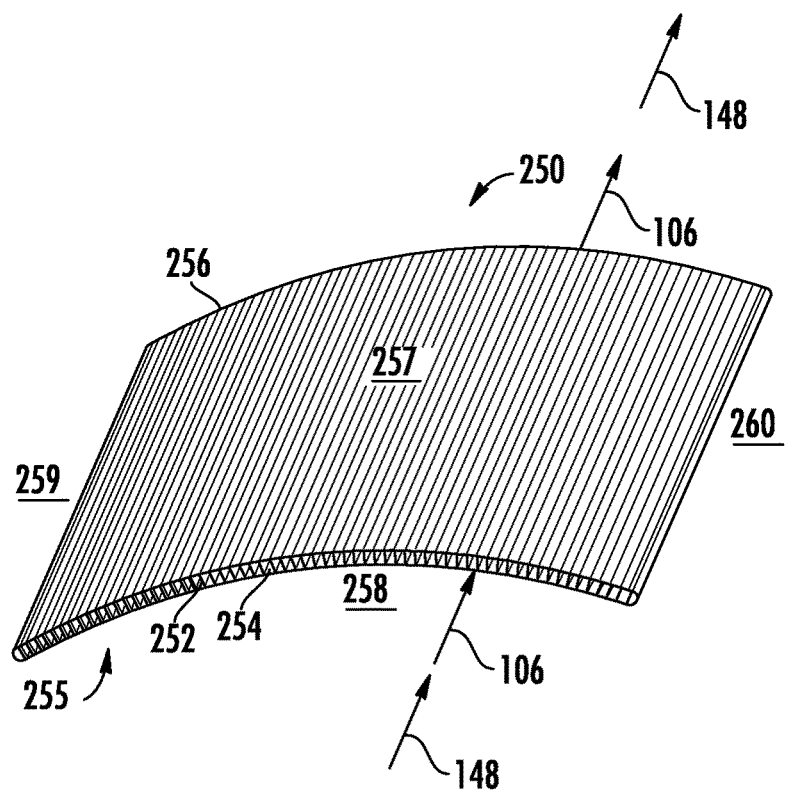
FIG. 7 shows a perspective view of an exemplary blade according to one embodiment of the present disclosure.
Figure 8:
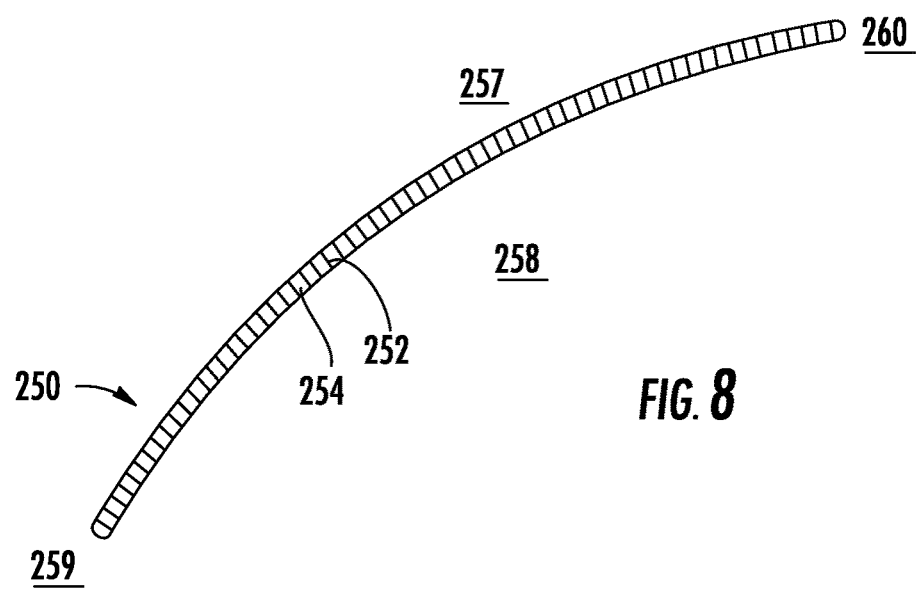
FIG. 8 shows a side view of the exemplary blade of FIG. 7.
Figure 10:
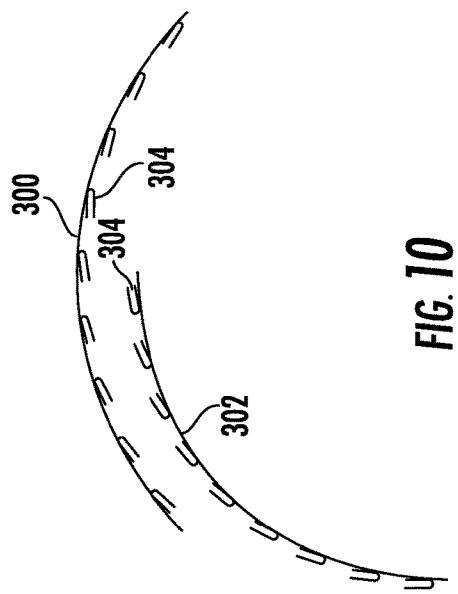
FIG. 10 shows a side view of the exemplary outer blade containment ring segment and inner blade containment ring segment of FIG. 9.

Referring now to FIG. 7 and FIG. 8, in conjunction with FIG. 6, an exemplary embodiment is provided of the blade plenum segment 202 defining a blade plenum egress 206 to which a first side 255 of the blade 250 is connected in fluid communication with the blade plenum segment 202. The blade plenum segment 202 defines the blade plenum egress 206 on a side 217 of the blade plenum segment 202 opposite of the blade plenum opening 204 such that the first side 255 or the second side 256 of the blade 250 is fully connected to the blade plenum segment 202. The connection of the blade 250 to the blade plenum opening 204 is configured to prevent fluid communication between the cooled fluid 148 along the internal cooled fluid flowpath 148 and the cooling fluid 146 along the external cooling fluid flowpath 108. The external cooling fluid flowpath 108 extends axially across an outward side 257 and an inward side 258 of the blade 250.

In one embodiment, sealing the blade plenum segment 202 and the blade 250 from leaks or fluid communication with the cooling fluid 146 may include applying a gasket. In another embodiment, the blade plenum segment 202 and the blade 250 are sealed using a high temperature adhesive or sealant, such as a silicone rubber, an epoxy adhesive, or ceramic adhesive. In yet another embodiment, a high temperature rubber nozzle may be placed between the blade plenum egress 206 and the blade 250.

The plurality of blades 250 connected to a plurality of blade plenum segments 202 defines an angular space 218 between each blade 250 and blade plenum segment 202 by way of attachment to the blade plenum egress 206 on the blade plenum segment 202. The angular space 218 between each blade 250 is approximately uniform from the outward side 257 of a first blade to the inward side 258 of a circumferentially adjacent blade, such that an optimal and axisymmetric heat transfer may occur between the cooled fluid 148 and the cooling fluid 146 around the entire circumference of the heat exchanger 100. The optimal angular space 218 is a function of the thermal conductivity of the cooled fluid 148, the cooling fluid 146, and the heat exchanger 100, as well as the flow rate and pressure of the fluids 146, 148 and the heat transfer requirements of the system. For example, in one embodiment, the angular space 218 between the first blade plenum segment 214 and the second blade plenum segment 215 may be a value approximately between 4 and 46 degrees to provide an optimal combination of heat transfer between the cooled fluid 148 and the cooling fluid 146 through the blade 250. In another embodiment, the angular space 218 may be a value approximately between 6 and 23 degrees. In yet another embodiment, the angular space 218 may be a value approximately between 7 and 7.5 degrees.

Referring still to FIG. 7 and FIG. 8, in conjunction with FIG. 6, an exemplary embodiment is provided of the blade 250 including an axially-extending wall 252. The plurality of walls 252, the outward side 257, and the inward side 258 of the blade 250 define a plurality of blade flow passages 254. The plurality of blade flow passages 254 defined by the walls 252, the outward side 257, and the inward side 258 of the blade 250 promote heat transfer and thermal load sharing from the cooled fluid 148 through the walls 252 to the outward side 257 and the inward side 258 of the blade 250. The cooling fluid 146 is in thermal communication with the blade 250 as the cooling fluid 146 flows across the outward side and inward side 257, 258 of the blade, which promotes a heat transfer effect to reduce the temperature of the cooled fluid 148 flowing across the flow passages 254 of the blade 250. The plurality of blade flow passages 254 may increase structural rigidity and reduce undesired vibratory modes.

The first side 255 and the second side 256 of the blade 250 are defined by the geometry of the blade plenum segment 202 to which the blade 250 attaches. The blade 250 includes a radially inward end 259 generally corresponding to the geometry of the second radius 209 of the blade plenum segment 202 (FIG. 6). Similarly, the blade 250 includes a radially outward end 260 generally corresponding to the geometry of the first radius 208 of the blade plenum segment 202.

The blade 250 is constructed of materials that may effectively promote heat transfer from the cooled fluid 148 to the cooling fluid 146. For example, in one embodiment, the blade 250 may include a ceramic with a high thermal conductivity, such as, but not limited to, aluminum nitride, silicon carbide, alumina, or silicon nitride, or combinations thereof. In another embodiment, the blade 250 may include a metal with a high thermal conductivity, such as but not limited to, cemented carbide, carbon steel, aluminum alloys, or combinations thereof. In yet another embodiment, the blade 250 is constructed of materials that may promote additive manufacturing or are better suited to an engine environment, such as titanium, nickel, or aluminum, or their alloys, or combinations thereof. Combinations of materials may include mixtures of materials, layers, or segments of a single blade 250, or alternating arrangements of blades 250 of different materials arranged around the annulus of the heat exchanger 100.

Referring now to FIGS. 9-12, exemplary embodiments are provided of an outer blade containment segment 300, an inner blade containment segment 302, and a blade retainer 304 on the outer and inner blade containment segments 300, 302. A plurality of outer and inner blade containment segments 300, 302 define a blade containment annular ring 306 providing axial and radial retention of the blades 250 in the modular annular heat exchanger 100. The outer blade containment segment 300 defines a curved outer surface 301 that forms a radially outward (in direction RR) annular portion of the blade containment ring 306. A plurality of blade retainers 304 is positioned on a radially inward face opposite of the outer surface 301. The plurality of outer blade containment segments 300 is positioned in circumferentially adjacent arrangement to define a radially outward (in direction RR) annular portion of the blade containment annular ring 306.

Similarly, the inner blade containment segment 302 defines a curved inner surface 303 that forms an annular portion of the blade containment ring 306 that is radially inward (in direction RR) of the outer blade containment segment 300. The plurality of inner blade containment segments 302 is positioned in circumferentially adjacent arrangement at a location radially inward from the outer blade containment segments 300 to define a radially inward (in direction RR) annular portion of the blade containment annular ring 306.

The blade retainers 304 on each of the outer and inner blade containment segments 300, 302 includes a first retention wall 307 radially outward from a second retention wall 308. The first and second retention walls 307, 308 extend at a chord of the annular circumference 92. The first and second retention walls 307, 308 are connected by a radial retention wall 309. The radial retention wall 309, first retention wall 307, and second retention wall 308 together define a blade retainer opening 310 to hold the blade 250. The first, second, and radial retention walls 307, 308, 309 are radially elongated and axially elongated (along direction AA) to axially, radially, and circumferentially retain the blade 250.

Figure 12:
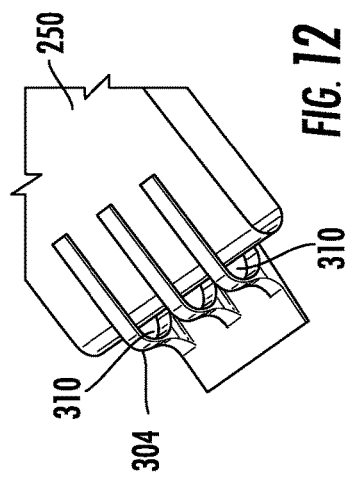
FIG. 12 shows a perspective view of the exemplary blade retainer of FIG. 11 in combination with an exemplary embodiment of a blade according to one embodiment of the present disclosure.

In an exemplary embodiment provided in FIG. 12, a plurality of blade retainers 304 are defined to retain the blade 250. In another embodiment, the blade retainer 304 may be axially elongated across the axial length of the outer or inner blade containment segments 300, 302. In either embodiment, the geometry of the first, second, and radial retention walls 307, 308, 309 defines the blade retainer opening 310 such that the blade 250 is axially, radially, and circumferentially secured in position across the range of temperatures, and subsequent thermal expansion that occurs, that the modular annular heat exchanger 100 and its constituent components may experience.

Referring now to FIGS. 7-12, an exemplary embodiment of the radially inward end 259 of the blade 250 is positioned within the blade retainer opening 310 of the blade retainer 304 positioned on the inner blade containment ring segment 302. The radially outward end 260 is positioned within the blade retainer opening 310 of the blade retainer 304 positioned on the outer blade containment ring segment 300. The blades 250 may be axially and radially fixed to the blade retainers 304 by force without a mechanical fastener or joint, e.g. press fit, interference fit, or the sum of assembly forces of the heat exchanger 100.

Referring still to the exemplary embodiments of the blade retainers 304 provided, in one embodiment of the present disclosure the blade retainers 304 may be joined to the outer and inner blade containment rings 300, 302 by a mechanical fastener, such as, but not limited to, screws, bolt and nut, or rivets. In another embodiment, the blade retainers 304 may be joined by other joining processes, such as, but not limited to, welding, brazing, soldering, bonding, or applying high-temperature adhesives. In yet another embodiment, the blade retainers 304 are formed integrally to the outer and inner blade containment segments 300, 302 such as by, but not limited to, additive manufacturing or casting.

It should be appreciated that the aforementioned description of the geometry, dimensional relationships, constituent components, figures, and embodiments of the cooled fluid inlet plenum 140, including the first feeder plenum 150 in fluid connection with the first blade plenum 200, of which is fluidly connected to the first side 255 of blade 250, apply generally to the cooled fluid outlet plenum 142, including the second blade plenum 210 fluidly connected to the second feeder plenum 160, the second blade plenum 210 fluidly connected at the second side 256 of the blade 250. However, in one embodiment, the cooling fluid inlet or outlet plenum 140, 142 may define a curvilinear axial cross section (along direction AA) such that the heat exchanger 100 at the first end 97 defines a larger radial cross section than at the second end 99. In yet another embodiment, a curvilinear axial cross section may define a smaller radial cross section at the first end 97 than at the second end 99.

Figure 13:
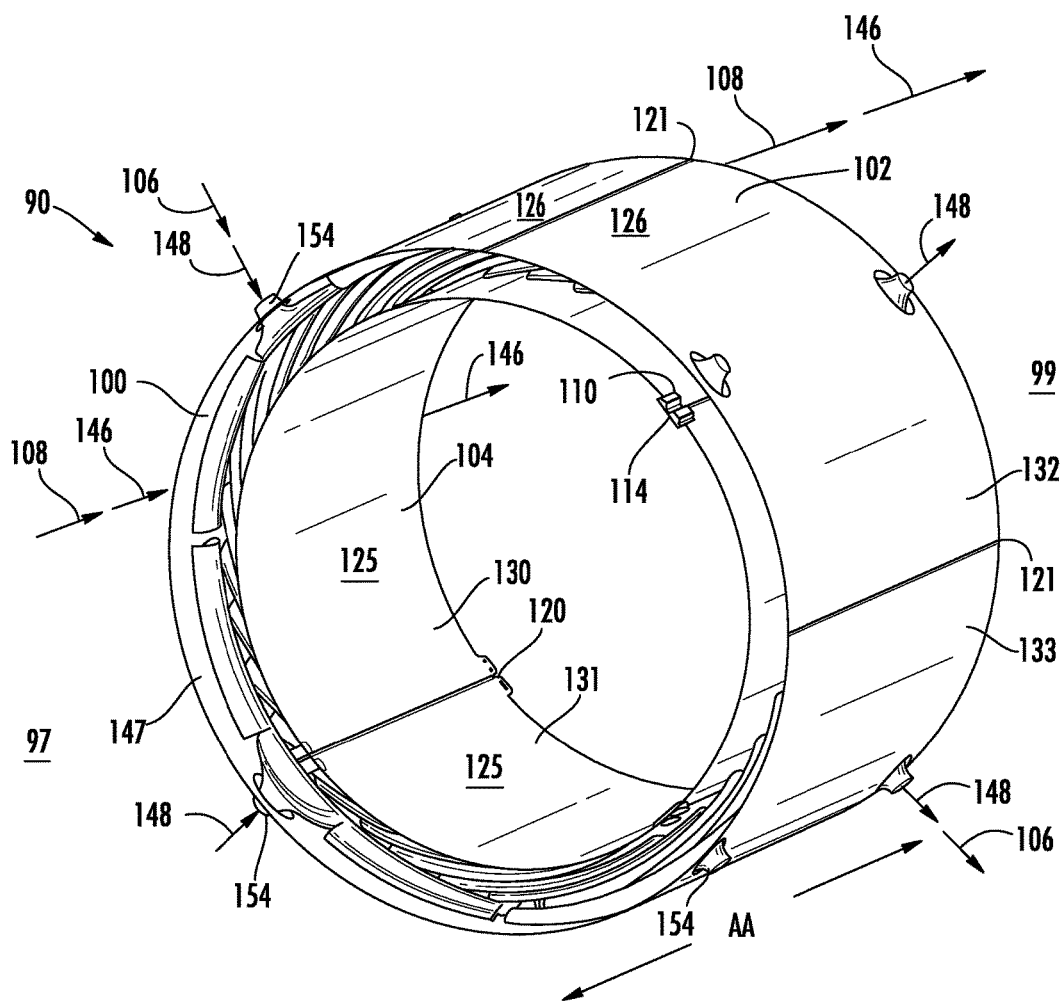
FIG. 13 shows a perspective view of an exemplary embodiment of an annular duct including an exemplary embodiment of an modular annular heat exchanger according to one embodiment of the present disclosure.

Referring now to FIG. 13, a perspective view of an exemplary embodiment of an annular duct 90 is provided, including the modular annular heat exchanger 100 encased by an outer annular ring 102 and an inner annular ring 104. The outer annular ring 102 includes an opening 105 through which the feeder plenum opening 154 extends radially outward (extending outward from axial centerline 101). The cooled fluid 148 flows into the feeder plenum opening 154 at the first end 97 and flows out of the feeder plenum opening 154 at the second end 99, flowing through the heat exchanger 100 in between. The outer annular ring 102 and the inner annular ring 104 define the external cooling fluid flowpath 108 through which the cooling fluid 146 flows from the first end 97 of the modular annular heat exchanger 100 to the second end 99, across the cooled fluid inlet plenum 140, the plurality of blades 250, and the cooled fluid outlet plenum 142. Thermal communication between the cooled fluid 148 flowing through the heat exchanger 100 and the cooling fluid 146 flowing along the external cooling fluid flowpath 108 decreases the temperature of the cooled fluid 148. It should be understood that the flow direction of the cooling fluid 146 may be changed as desired e.g. the cooling fluid 146 flows along the external cooling fluid flowpath 108 from the second end 99 to the first end 97.

Figure 9:
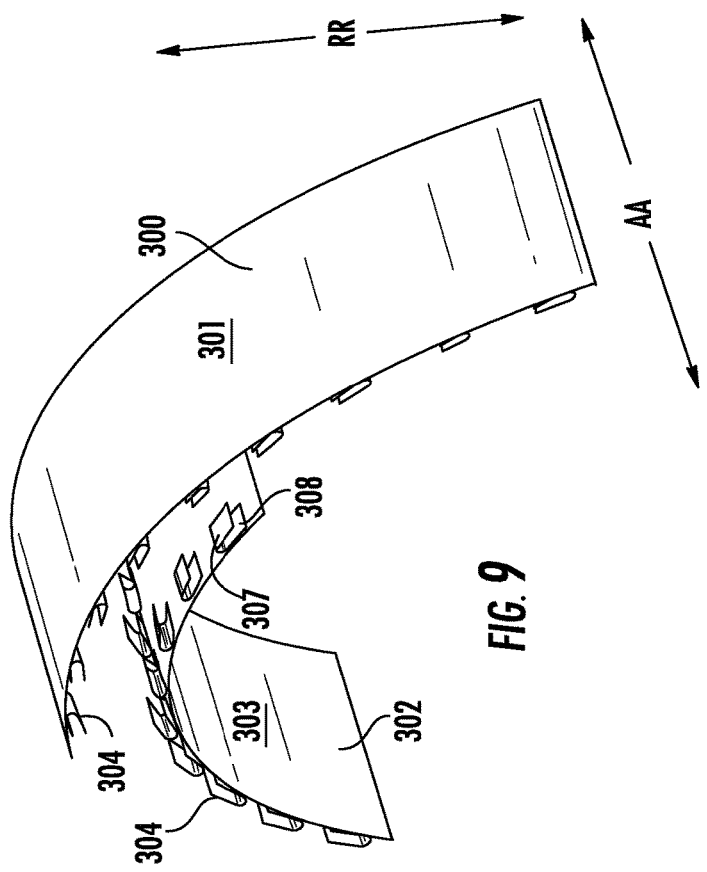
FIG. 9 shows a perspective view of an exemplary outer blade containment ring segment and inner blade containment ring segment according to one embodiment of the present disclosure.
Figure 11:
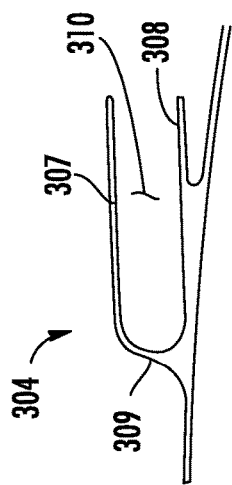
FIG. 11 shows a side view of an exemplary blade retainer according to one embodiment of the present disclosure.

The inner annular ring 104 includes an inner annular ring segment 125, a plurality of which is in adjacent circumferential arrangement to one another to define the inner annular ring 104. The inner annular ring segment 125 includes the inner blade containment ring segment 302. The inner annular ring segment 125 defines an outside surface 127 that is attached to the inside surface 303 of the inner blade containment ring segment 302 (FIG. 9). The inner annular ring segment 125 and the inner blade containment ring segment 302 are attached by way of a joining process, such as, but not limited to, welding, brazing, soldering, diffusion bonding, or other forms of bonding. In other embodiments, mechanical fastening features, such as, but not limited to, nut plates, holes, threaded holes, clips, anchors, pins, or latches may be included and employed in conjunction with bolts, screws, nuts, rivets, or other mechanical fasteners to join the outside surface 127 of the inner annular ring segment 125 to the inside surface 303 of the inner blade containment ring segment 302 (FIG. 9). In yet another embodiment, the inner annular ring segment 125 and the inner blade containment ring segment 302 are constructed as a single, unitary structure, such as by, but not exclusively, additive manufacturing, casting, or machined forging.

Similarly to the embodiment of the inner annular ring 104, the outer annular ring 102 includes an outer annular ring segment 126, a plurality of which is in adjacent circumferential arrangement to one another to define the outer annular ring 102. The outer annular ring segment 126 includes the outer blade containment ring segment 300. The outer annular ring segment 126 defines an inner surface 128. The inner surface 128 of the outer annular ring segment 126 is attached to the outside surface 301 of the outer blade containment ring segment 300 (FIG. 9). The outer annular ring segment 126 and the outer blade containment ring segment 300 are attached by way of methods similar to the inner annular ring segment 126 to the inner blade containment ring segment 302.

Each pair of circumferentially adjacent inner annular ring segments 125 defines an inner diameter (ID) circumferential gap 120, such as between a first inner annular ring segment 130 and a second inner annular ring segment 131 circumferentially adjacent to the first inner annular ring segment 130. Each pair of circumferentially adjacent outer annular ring segments 126 defines an outer circumferential (OD) gap 121, such as between a first outer annular ring segment 132 and a second outer annular ring segment 133 circumferentially adjacent to the first outer annular ring segment 133. The ID and OD circumferential gap 120, 121 between each pair of circumferentially adjacent segments 125, 126 reduce structural constraints, thereby permitting radial, axial, and circumferential growth of the outer or inner annular rings 102, 104 while reducing thermal stresses, increasing high cycle fatigue life, and reducing vibrations.

Altogether, the inner annular ring 104 includes at least a first inner annular ring segment 130 and a second inner annular ring segment 131 in circumferentially adjacent arrangement. The first and second inner annular ring segments 130, 131 each include a plurality of blade retainers 304 defining an axial and circumferential position, and a radially inward position, of the blades 250, the cooled fluid inlet plenum 140, and the cooled fluid outlet plenum 142.

Similarly to the embodiment of the inner annular ring 104, the outer annular ring 102 includes at least a first outer annular ring segment 132 and a second outer annular ring segment 133 in circumferentially adjacent arrangement. The first and second outer annular ring segments 132, 133 each include a plurality of blade retainers 304 defining an axial and circumferential position, and a radially outward position, of the blades 250, the cooled fluid inlet plenum 140, and the cooled fluid outlet plenum 142.

The ID and OD circumferential gap 120, 121 between the outer or inner annular ring segments 125, 126 may be filled with a flexible high temperature adhesive, such as, but not limited to, silicone rubber (e.g. room temperature vulcanization silicone) or an epoxy. The addition of an adhesive may promote maintaining the cooling fluid 146 within the external cooling fluid flowpath 108 and mitigate fluid migration to other areas of the annular duct 90 while permitting radial, axial, and circumferential growth of the outer and inner annular rings 102, 104 and reducing thermal stresses.

Figure 14:
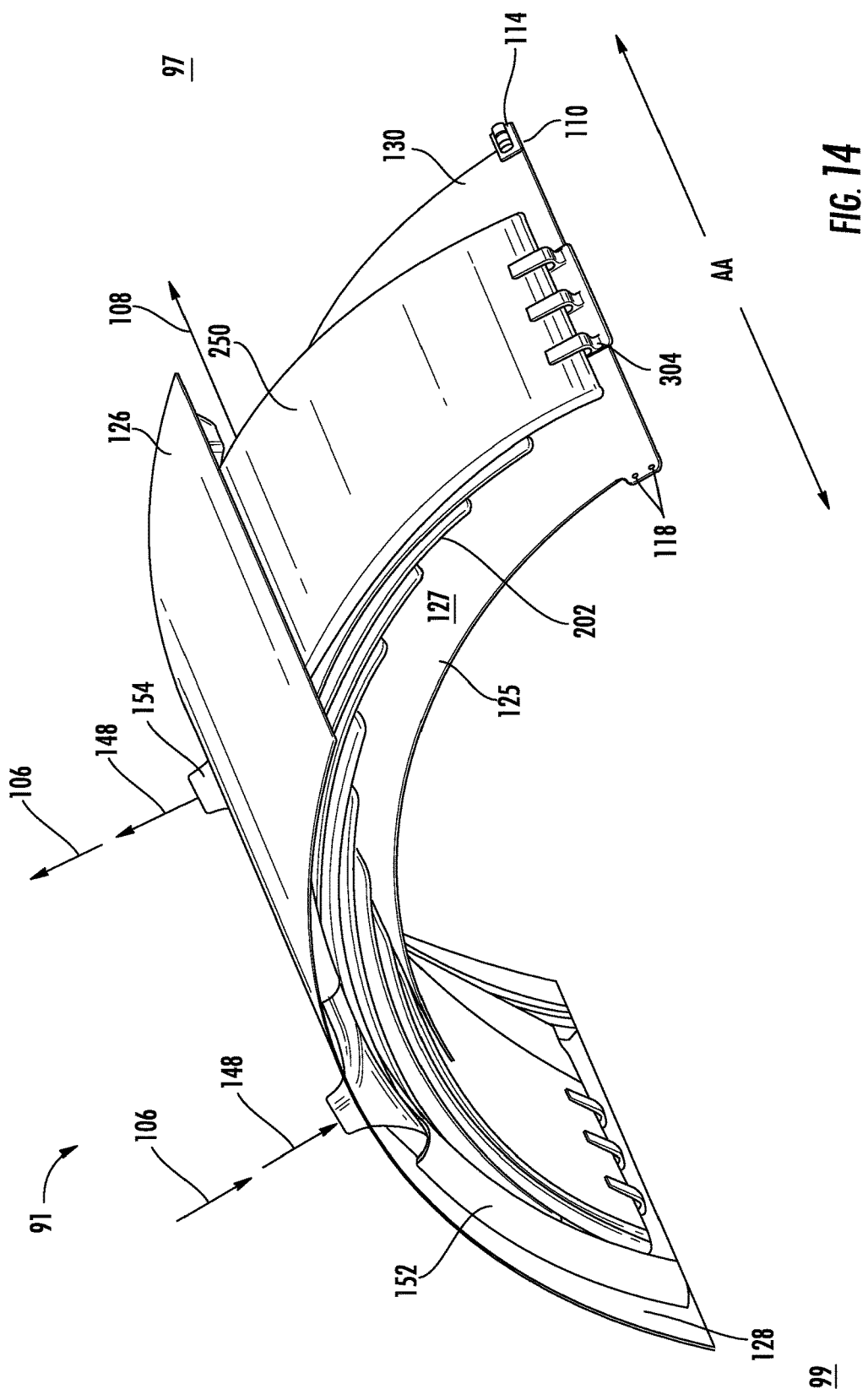
FIG. 14 shows a perspective view of a radial module of the exemplary embodiment of the annular duct of FIG. 13.

Referring now to FIG. 14, an exemplary embodiment of a radial module 91 of an annular duct 90 is provided. The radial module 91 of the annular duct 90 includes a cooled fluid inlet plenum segment 141, a plurality of blades 250 configured in circumferentially adjacent arrangement, and a cooled fluid outlet plenum segment 143. The plurality of blades 250 defines an angular space 218 that is conformal between each circumferentially adjacent blade 250. The cooled fluid inlet plenum segment 141, the plurality of blades 250, and the cooled fluid outlet plenum segment 143 are in serial axial flow arrangement and define an internal cooled fluid flowpath 106 and an external cooled fluid flowpath 108 parallel to the internal cooled fluid flowpath 106. The radial module 91 further includes an inner annular ring segment 125 and an outer annular ring segment 126.

The inner and outer annular ring segments 125, 126 each define a plurality of blade retainers 304. The blade retainers 304 define an axial, radial, and circumferential position of the blades 250, the cooled fluid inlet plenum segment 141, and the cooled fluid outlet plenum segment 143.

Referring now to FIG. 13 and FIG. 14, the annular duct 90 is shown including four radial modules 90 in circumferentially adjacent arrangement. However, in another embodiment, the annular duct 90 may include other quantities of radial modules 91 in circumferentially adjacent arrangement. For example, the annular duct 90 may between 2 and 12 radial modules 91, inclusively. In another example, the annular duct 90 may include between 3 and 6 radial modules 91. However, in yet another embodiment, the annular duct 90 may define the features described herein that define a conformal annular duct 90 that is structurally constrained in six directions while permitting thermal expansion in six directions. For example, the six directions include axially forward and aft along direction AA (i.e. toward the first end 97 and the second end 99), and radially outward in all directions from the axial centerline 101.

Referring now to FIG. 13-17, an exemplary embodiment is provided of an inner annular ring segment 125 including a mount assembly 109. The mount assembly 109 includes a first pin housing 110 positioned on the first inner annular ring segment 130, and a second pin housing 111 positioned on the second inner annular ring segment 131. A pin retainer 114 is positioned on an engine component axially adjacent to the first and second pin housings 110, 111. The pin housings 110, 111 are positioned on circumferentially opposing ends of the inner diameter radial gap 120 at the first end 97 or the second end 99 of the inner annular ring segments 130, 131. The pin housings 110, 111 define a hole to retain a pin 112. The pin housings 110, 111 are configured to define a hole with sufficient axial depth (along direction AA) to permit axial expansion of the heat exchanger 100.

As shown in further detail in FIG. 16, an exemplary embodiment of the pin retainer 114 is provided, including an elongated slot 115 extending along a chord of the annular circumference 92 of the heat exchanger 100 (along direction CC). A pin retainer 114 is positioned on an engine component that is axially opposed to the pin housings 110, 111. The pin 112 of the first pin housing 110 is positioned in the elongated slot 115, providing for axial and radial movement of the inner annular ring segments 125, inner annular ring 102, and the heat exchanger 100 while reducing thermal stresses. The pin 112 of the second pin housing 111 is positioned in a hole 116 of the pin retainer 114, providing a fixed radial location for the heat exchanger 100 and annular duct 90 relative to the gas turbine engine to which it may be installed.

In the exemplary embodiment of the pin retainer 114 and pins 112 provided in FIG. 16, the pins are in the pin retainer 114. In other embodiments, the pins 112 may be fixed in the pin housings 110, 111. In still other embodiments, the pins 112 are not fixed to either the pin housings 110, 111 or the pin retainer 114 but are retained in place by dimensional constraints and forces by the assembly of the annular duct 90 to the gas turbine engine to which the annular duct 90 may be installed.

Referring now to FIG. 17, an exemplary embodiment of an aspect of the first and second inner annular ring segments 130, 131 is provided, in which the second annular ring segment 131 defines a circumferentially elongated slot 117 (along direction CC) and the first annular ring segment 130 defines a plurality of apertures 118. The slot 117 and apertures 118 are the retention features for the pin retainer 114 at the second end 99 of the first and second annular ring segments 130, 131. A mechanical fastener, such as, but not limited to, a bolt and nut, or screw, may retain the pin retainer 114 to the apertures 118 and slot 117. The circumferentially elongated slot 117 may promote minimally restricted radial or circumferential movement of the heat exchanger 100 while reducing thermal stresses due to thermal expansion of the heat exchanger 100.

Referring back to FIGS. 13-17, it should be understood that the mount assembly 109, including the pin housings 110, 111, pin retainer 114, and the apertures 118 and slot 117 may be arranged and positioned on axially adjacent components at the first end 97 or second end 99 of the annular duct 90 to produce a substantially similar effect of promoting minimally restricted radial or circumferential growth of the heat exchanger 100 during operation. For example, in one embodiment, the pin retainer 114 or aspects thereof may be positioned on the first or second inner annular ring segments 130, 131. In another embodiment, the pin retainer 114 or aspects thereof may be positioned on the first or second outer annular ring segments 132, 133.

The mount assembly 109 as described in reference to FIGS. 13-17 connects a plurality of radial modules 91 in circumferentially adjacent arrangement to define the annular duct 90. The annular arrangement of radial modules 91 defines a series of circumferentially adjacent blades 250. The circumferentially overlapping 216 blades 250 define a circumferentially continuous axisymmetric heat transfer area configured to substantially uniformly distribute the heat transfer load throughout the circumference 92 and the axial length (in direction AA) of the heat exchanger 100. Additionally, the continuous axisymmetric heat transfer area shares the thermal loads throughout the entire circumference of the heat exchanger 100 thereby limiting radial variations in temperature of the cooling fluid 146 or the cooled fluid 148 as either exit the heat exchanger 100.

As described with reference to the embodiments shown in FIGS. 1-17, the annular duct 90 is defined by the plurality of circumferentially arranged radial modules 91 retained in six directions while also permitting minimally restrained thermal growth in all six directions. The arrangement of feeder plenum segments 152 to blade plenum segments 202, such as, but not exclusively, the axially elongating feeder plenum egress 156 overlapping the axially elongating blade plenum opening 204, permit axial growth (along direction AA) while minimizing fluid communication between the cooled fluid 148 and the cooling fluid 146; the modular configuration of radial modules 91 permit minimally restricted radial (extending from the axial centerline 101) and circumferential growth for the heat exchanger 100 and the annular duct 90; and the mount assembly 109 defining the inner annular ring segment slot 117 positions the radial modules 91 in circumferential arrangement to define the annular duct 90 within a gas turbine engine while permitting minimally restricted axial, circumferential, and radial movement of the annular duct 90 and its included components.

It should be understood that the various aspects and embodiments provided in reference to FIGS. 1-17 may be assembled, joined, or positioned using a variety of manufacturing methods. Such methods may include, but are not limited to, the use of silicone rubber, epoxy, or ceramic adhesives; interference fit tolerances and the use of mechanical force or thermal differences (e.g. cooling a first component and heating a second component to provide clearances to join the first and second components); or the use of mechanical fasteners (e.g. bolts and nuts, screws, rivets, clips, welding, brazing, soldering, bonding, etc). Furthermore, the modular annular heat exchanger 100 and the annular duct 90 described above may be constructed of one or several materials, including, but not limited to, titanium, nickel, aluminum, steel, austenite, tungsten, molybdenum, ceramic, or alloys or composites of each material, or combinations thereof In one embodiment, the annular duct 90 is used in a method of cooling a hot fluid of a gas turbine engine. The directing the hot fluid through a plurality of blade flow passages 254 in the blade 250 that are radially overlapped 216 within the annular duct 90 to define a heat transfer area; and passing a cooling fluid 146 along the external cooling fluid flowpath 108 defined by the annular duct such that the cooling fluid 146 passes axially and at least partially parallel to the internal cooled fluid flowpath 106 between the radially overlapping blades 250. For example, the cooling fluid 146 generally flows through the annular duct 90 in an axial direction of the gas turbine engine.

Figure 18:
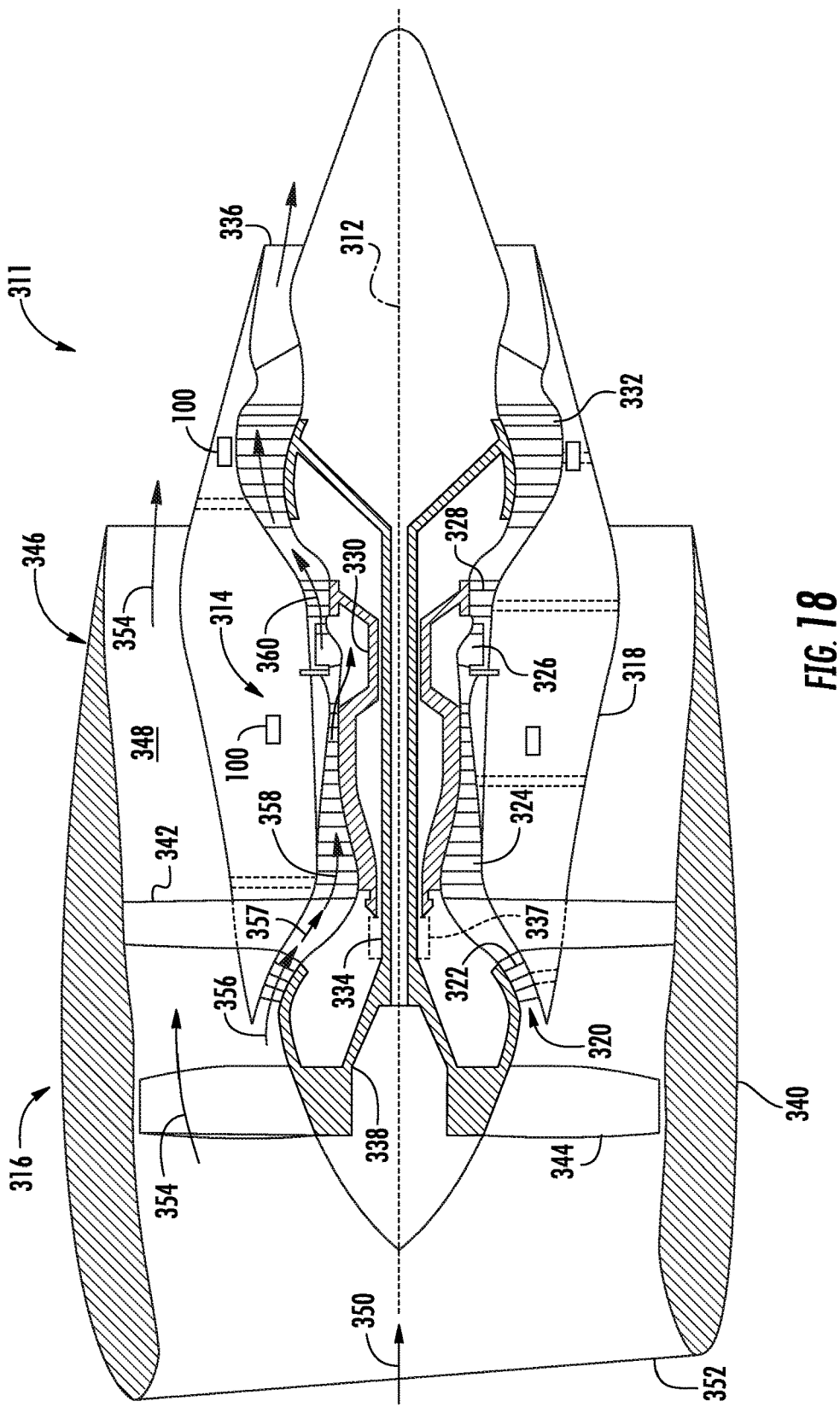
FIG. 18 shows a cross-sectional view of an embodiment of a gas turbine engine that may include an exemplary annular duct according to one embodiment of the present disclosure.

For example, FIG. 18 illustrates a cross-sectional view of one embodiment of a gas turbine engine 311 including one or more annular heat exchangers 100. The position of the annular heat exchanger(s) may be varied as desired, but is in particular embodiments within the core engine 314. For instance, the modular annular heat exchanger 100 can utilize fan air 354 as the cooling fluid (either directly or routed into the annular duct), and the hot fluid can be bleed air from the core of the gas turbine engine. The gas turbine engine may be utilized within an aircraft in accordance with aspects of the present subject matter, with the engine 311 being shown having a longitudinal or axial centerline axis 312 extending therethrough for reference purposes.

In general, the engine 311 may include a core gas turbine engine (indicated generally by reference character 314) and a fan section 316 positioned upstream thereof. The core engine 314 may generally include a substantially tubular outer casing 318 that defines an annular inlet 320. In addition, the outer casing 318 may further enclose and support a booster compressor 322 for increasing the pressure of the air that enters the core engine 314 to a first pressure level. A high pressure, multi-stage, axial-flow compressor 324 may then receive the pressurized air from the booster compressor 322 and further increase the pressure of such air. The pressurized air exiting the high-pressure compressor 324 may then flow to a combustor 326 within which fuel is injected into the flow of pressurized air, with the resulting mixture being combusted within the combustor 326. The high energy combustion products are directed from the combustor 326 along the hot gas path of the engine 311 to a high pressure turbine 328 for driving the high pressure compressor 324 via a high pressure drive shaft 330, and then to a low pressure turbine 332 for driving the booster compressor 322 and fan section 316 via a low pressure drive shaft 334 that is generally coaxial with high pressure drive shaft 330. After driving each of turbines 328 and 332, the combustion products may be expelled from the core engine 314 via an exhaust nozzle 336 to provide propulsive jet thrust.

It should be appreciated that, in several embodiments, the engine 311 may further include an intermediate pressure compressor between the booster compressor 322 and the high pressure compressor 324. Additionally, an intermediate pressure turbine may be positioned between the high pressure turbine 328 and the low pressure turbine 332. The intermediate pressure compressor and intermediate pressure turbine may be rotatably coupled to an intermediate pressure shaft that is coaxial to the LP shaft 334 and the HP shaft 330.

It should be further appreciated that each compressor 322, 324 may include a plurality of compressor stages, with each stage including both an annular array of stationary compressor vanes and an annular array of rotating compressor blades positioned immediately downstream of the compressor vanes. Similarly, each turbine 328, 332 may include a plurality of turbine stages, with each stage including both an annular array of stationary nozzle vanes and an annular array of rotating turbine blades positioned immediately downstream of the nozzle vanes.

Additionally, as shown in FIG. 18, the fan section 316 of the engine 311 may generally include a rotatable, axial-flow fan rotor assembly 338 that is configured to be surrounded by an annular fan casing 340. It should be appreciated by those of ordinary skill in the art that the fan casing 340 may be configured to be supported relative to the core engine 314 by a plurality of substantially radially-extending, circumferentially-spaced outlet guide vanes 342. As such, the fan casing 340 may enclose the fan rotor assembly 338 and its corresponding fan rotor blades 344. Moreover, a downstream section 346 of the fan casing 340 may extend over an outer portion of the core engine 314 so as to define a secondary, or by-pass, airflow conduit 48 that provides additional propulsive jet thrust.

In several embodiments, the low pressure drive shaft 334 may be directly coupled to the fan rotor assembly 338 to provide a direct-drive configuration. Alternatively, the low pressure drive shaft 334 may be coupled to the fan rotor assembly 338 via a speed reduction device 337 (e.g., a reduction gear or gearbox) to provide an indirect-drive or geared drive configuration. Such a speed reduction device(s) may also be provided between any other suitable shafts and/or spools within the engine 311 as desired or required.

During operation of the engine 311, it should be appreciated that an initial air flow (indicated by arrow 350) may enter the engine 311 through an associated inlet 352 of the fan casing 340. The air flow 350 then passes through the fan blades 344 and splits into a first compressed air flow (indicated by arrow 354) that moves through fan bypass conduit 348 and a second compressed air flow (indicated by arrow 356) that moves through core flow conduit 357 which enters the booster compressor 322. The pressure of the second compressed air flow 356 is then increased and enters the high pressure compressor 324 (as indicated by arrow 358). After mixing with fuel and being combusted within the combustor 326, the combustion products 360 exit the combustor 326 and flow through the first turbine 328. Thereafter, the combustion products 360 flow through the second turbine 332 and exit the exhaust nozzle 336 to provide thrust for the engine 311.

It should be appreciated that, in several embodiments, in addition to the fan bypass conduit 348 and the core flow conduit 357, the engine 311 may be configured to define a third stream that directs a portion of the second compressed airflow 356 to bypass the high pressure compressor 324, combustor 326, and turbines 328, 332. One embodiment of the heat exchanger 100 of the present disclosure positions the heat exchanger 100 annularly around the high pressure compressor 324. In another embodiment, the heat exchanger 100 may be positioned annularly around the high pressure turbine 328. In yet another embodiment, the heat exchanger 100 may be positioned radially around the high pressure compressor 324 or the turbines 328, 332 within a third stream axial flowpath.

As stated, a fluid (e.g., bleed air) can be cooled in the annular duct of a gas turbine engine through the presently described apparatus. In one embodiment, the fluid can be directed through an internal cooled fluid flowpath, including a plurality of blade flow passages that are radially overlapped within the annular duct to define a heat transfer area (e.g., defined within a plurality of blades as described above), and a cooling fluid can be passed through the external cooling fluid flowpath defined by the annular duct such that the cooling fluid passes between the radially overlapping blade flow passages.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An annular duct including a modular annular heat exchanger for a gas turbine engine, comprising:
   a plurality of radial modules in circumferentially adjacent arrangement, wherein each radial module comprises;
      a cooled fluid inlet plenum segment;
      a plurality of blades configured in circumferentially adjacent arrangement and defining an angular space that is conformal between each circumferentially adjacent blade, at least one of the plurality of blades comprising a plurality of walls between an outward side and an inward side of the blade, the plurality of walls defining a plurality of blade flow passages;
      a cooled fluid outlet plenum segment, wherein the cooled fluid inlet plenum segment, the plurality of blades, and the cooled fluid outlet plenum segment are in serial axial flow arrangement and define an internal cooled fluid flowpath and an external cooling fluid flowpath parallel to the internal cooled fluid flowpath;
      an inner annular ring segment; and
      an outer annular ring segment, wherein the inner annular ring segment and the outer annular ring segment define a plurality of blade retainers, the blade retainers defining an axial, radial, and circumferential position of the blades, the cooled fluid inlet plenum segment, and the cooled fluid outlet plenum segment.

2. The annular duct of claim 1, wherein the annular duct comprises between 2 and 12 radial modules inclusively, arranged circumferentially adjacent to one another and defining a circumferential space between each pair of circumferentially adjacent modules.

3. The annular duct of claim 2, wherein the annular duct comprises between 3 and 6 radial modules.

4. The annular duct of claim 1, wherein the angular space between the plurality of blades is between about 4 and 46 degrees.

5. The annular duct of claim 4, wherein the angular space between the plurality of blades is between about 6 and 23 degrees.

6. The annular duct of claim 5, wherein the angular space between the plurality of blades is between about 7 and 7.5 degrees.

7. The annular duct of claim 1, wherein the plurality of blades define a plurality of cooled fluid flowpaths between the cooled fluid inlet plenum segment and the cooled fluid outlet plenum segment.

8. The annular duct of claim 1, wherein the plurality of blades each define a first radius at a first end and a second radius at a second end, the first radius greater than the second radius relative to an axial centerline.

9. The annular duct of claim 1, wherein the plurality of blades includes a first blade and a second blade at least partially circumferentially overlapping the first blade across an overlap angle.

10. The annular duct of claim 9, wherein the overlap angle is between about 20 and 80 degrees.

11. The annular duct of claim 10, wherein the overlap angle is between about 30 and 70 degrees.

12. The annular duct of claim 11, wherein the overlap angle is between about 30 and 40 degrees.

13. The annular duct of claim 1, wherein the plurality of radial modules in circumferentially adjacent arrangement define an inner diameter circumferential gap and an outer circumferential radial gap.

14. The annular duct of claim 13, wherein the inner diameter circumferential gap and the outer diameter circumferential gap is between about 5 and 10 degrees of a circumference of the annular duct.

15. The annular duct of claim 1, wherein the blade retainers include a first retention wall radially outward and parallel to a second retention wall, connected by a radial retention wall, the first retention wall and second retention wall axially and radially elongated to define a blade retainer opening into which the blade is positioned.

16. An annular duct for a gas turbine engine, comprising:
   a cooled fluid inlet plenum, including a plurality of cooled fluid inlet plenum segments in circumferentially adjacent arrangement and defining a circumferential space between each cooled fluid inlet plenum segment;
   a plurality of blades, configured in circumferentially adjacent arrangement and defining an angular space that is approximately uniform between each circumferentially adjacent blade; and
   a cooled fluid outlet plenum, including a plurality of cooled fluid outlet plenum segments in circumferentially adjacent arrangement to one another and defining a circumferential space between each cooled fluid outlet plenum segment, wherein the cooled fluid inlet plenum, the plurality of blades, and the cooled fluid outlet plenum are in serial axial flow arrangement and define an internal cooled fluid flowpath and an external cooling fluid flowpath at least partially parallel to the internal cooled fluid flowpath;
   an inner annular ring, wherein the inner annular ring includes at least a first inner annular ring segment and a second inner annular ring segment in circumferentially adjacent arrangement and defining a plurality of blade retainers, the blade retainers defining an axial, circumferential, and radially inward position of the blades, the cooled fluid inlet plenum, and the cooled fluid outlet plenum, and the first inner annular ring segment and the second inner annular ring segment defining an inner diameter circumferential gap;
   an outer annular ring, wherein the outer annular ring includes at least a first outer annular ring segment and a second outer annular ring segment in circumferentially adjacent arrangement and defining a plurality of blade retainers, the blade retainers defining an axial, circumferential and radially outward position of the blades, the cooled fluid inlet plenum, and the cooled fluid outlet plenum, and the first outer annular ring segment and the second outer annular ring segment defining an outer diameter circumferential gap; and a mount assembly, wherein the mount assembly includes a first pin housing positioned on the first inner annular ring segment, a second pin housing positioned on the second inner annular ring segment, and a plurality of pins.

17. A gas turbine engine comprising:

an annular duct, wherein the annular duct includes:

a cooled fluid inlet plenum, including a plurality of cooled fluid inlet plenum segments in circumferentially adjacent arrangement and defining a circumferential space between each cooled fluid inlet plenum segment;

a plurality of blades, configured in circumferentially adjacent arrangement and defining an angular space that is approximately uniform between each circumferentially adjacent blade; and a cooled fluid outlet plenum, including a plurality of cooled fluid outlet plenum segments in circumferentially adjacent arrangement and defining a circumferential space between each cooled fluid outlet plenum segment, wherein the cooled fluid inlet plenum, the plurality of blades, and the cooled fluid outlet plenum are in serial axial flow arrangement and define an internal cooled fluid flowpath and an external cooling fluid flowpath at least partially parallel to the internal cooled fluid flowpath;

an inner annular ring, wherein the inner annular ring includes at least a first inner annular ring segment and a second inner annular ring segment in circumferentially adjacent arrangement and defining a plurality of blade retainers, the blade retainers defining an axial, circumferential, and radially inward position of the blades, the cooled fluid inlet plenum, and the cooled fluid outlet plenum, and the first inner annular ring segment and the second inner annular ring segment defining an inner diameter circumferential gap;

an outer annular ring, wherein the outer annular ring includes at least a first outer annular ring segment and a second outer annular ring segment in circumferentially adjacent arrangement and defining a plurality of blade retainers, the blade retainers defining an axial, circumferential, and radially outward position of the blades, the cooled fluid inlet plenum, and the cooled fluid outlet plenum, and the first outer annular ring segment and the second outer annular ring segment defining an outer diameter circumferential gap; and a mount assembly, wherein the mount assembly includes a first pin housing positioned on the first inner annular ring segment, a second pin housing positioned on the second inner annular ring segment, and a plurality of pins; and a pin retainer, positioned on an engine component axially adjacent to the first pin housing and the second pin housing.

18. The gas turbine engine of claim 17, wherein the pin retainer defines an elongated slot into which the pin in the mount assembly is positioned, the elongated slot extending along a chord of a circumference of the annular duct.

19. The gas turbine engine of claim 17, wherein the pin retainer defines a hole into which the pin in the mount assembly is positioned, the hole fixing a radial position of the annular duct.

* * * * *